US011836242B2

(12) United States Patent
Graff et al.

(10) Patent No.: US 11,836,242 B2
(45) Date of Patent: Dec. 5, 2023

(54) CONTROLLED IDENTITY CREDENTIAL RELEASE

(71) Applicant: Apple Inc., Cupertino, CA (US)

(72) Inventors: Irene M. Graff, Cupertino, CA (US); Ahmer A. Khan, Milpitas, CA (US); Christopher Sharp, San Jose, CA (US); Libor Sykora, Prague (CZ); Lucia E. Ballard, San Francisco, CA (US); Rupamay Saha, San Jose, CA (US)

(73) Assignee: Apple Inc., Cupertino, CA (US)

( * ) Notice: Subject to any disclaimer, the term of this patent is extended or adjusted under 35 U.S.C. 154(b) by 299 days.

(21) Appl. No.: 16/840,200

(22) Filed: Apr. 3, 2020

(65) Prior Publication Data

US 2020/0320188 A1    Oct. 8, 2020

Related U.S. Application Data

(60) Provisional application No. 62/834,397, filed on Apr. 15, 2019, provisional application No. 62/829,626, filed on Apr. 4, 2019.

(51) Int. Cl.
*G06F 21/45* (2013.01)
*H04L 9/40* (2022.01)
*H04W 12/06* (2021.01)

(52) U.S. Cl.
CPC .......... *G06F 21/45* (2013.01); *H04L 63/0861* (2013.01); *H04W 12/068* (2021.01); *G06F 2221/2149* (2013.01)

(58) Field of Classification Search
CPC .. G06F 21/45; G06F 21/34; G06F 2221/2149; H04L 63/0861; H04W 12/0431; H04W 12/47; H04W 12/068
See application file for complete search history.

(56) References Cited

U.S. PATENT DOCUMENTS

| | | | | |
|---|---|---|---|---|
| 10,250,733 | B1* | 4/2019 | Gordon | H04M 1/673 |
| 2014/0058941 | A1* | 2/2014 | Moon | G06F 3/04886 |
| | | | | 705/42 |
| 2015/0271175 | A1* | 9/2015 | Je | H04L 63/102 |
| | | | | 726/4 |
| 2016/0205554 | A1* | 7/2016 | Cagle | H04W 12/08 |
| | | | | 455/411 |
| 2017/0109727 | A1* | 4/2017 | Han | G06Q 20/3674 |
| 2017/0193489 | A1* | 7/2017 | Jeon | G06Q 20/322 |
| 2018/0247295 | A1* | 8/2018 | Kim | H04M 1/673 |
| 2019/0392422 | A1* | 12/2019 | Yim | H04W 12/37 |

* cited by examiner

*Primary Examiner* — Nelson S. Giddins
(74) *Attorney, Agent, or Firm* — BAKERHOSTETLER

(57) ABSTRACT

A device for controlled identity credential release may include at least one processor configured to receive a request to release an identity credential of a user, the identity credential being stored on the device. The at least one processor may be further configured to authenticate the user associated with the identity credential. The at least one processor may be further configured to, responsive to the authentication, provide at least a portion of the identity credential, such as for display and/or to a terminal device over a direct wireless connection. The at least one processor may be further configured to cause the electronic device to enter a locked state and/or to remain in a locked state, responsive to providing the at least the portion of the identity credential.

20 Claims, 12 Drawing Sheets

CONTROLLED IDENTITY CREDENTIAL RELEASE

CROSS REFERENCE TO RELATED APPLICATIONS

This application claims the benefit of priority to U.S. Provisional Patent Application No. 62/829,626, entitled "Controlled Identity Credential Release," and filed on Apr. 4, 2019, and claims the benefit of priority to U.S. Provisional Patent Application No. 62/834,397, entitled "Controlled Identity Credential Release," and filed on Apr. 15, 2019, the disclosure of each of which is hereby incorporated herein in its entirety.

TECHNICAL FIELD

The present description relates generally to identity credential release, including controlled identity credential release.

BACKGROUND

Physical identity credentials, such as driver's licenses, passports, etc., may be migrating to digital form, such as digital identity credentials stored on electronic devices. As the credentials themselves change, so too will the manner in which a user provides his identity credential to a third party, such as a government official, a commercial entity, and the like. For example, the user may wirelessly transmit their digital identity credential from their device to a wireless terminal device of a third party.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
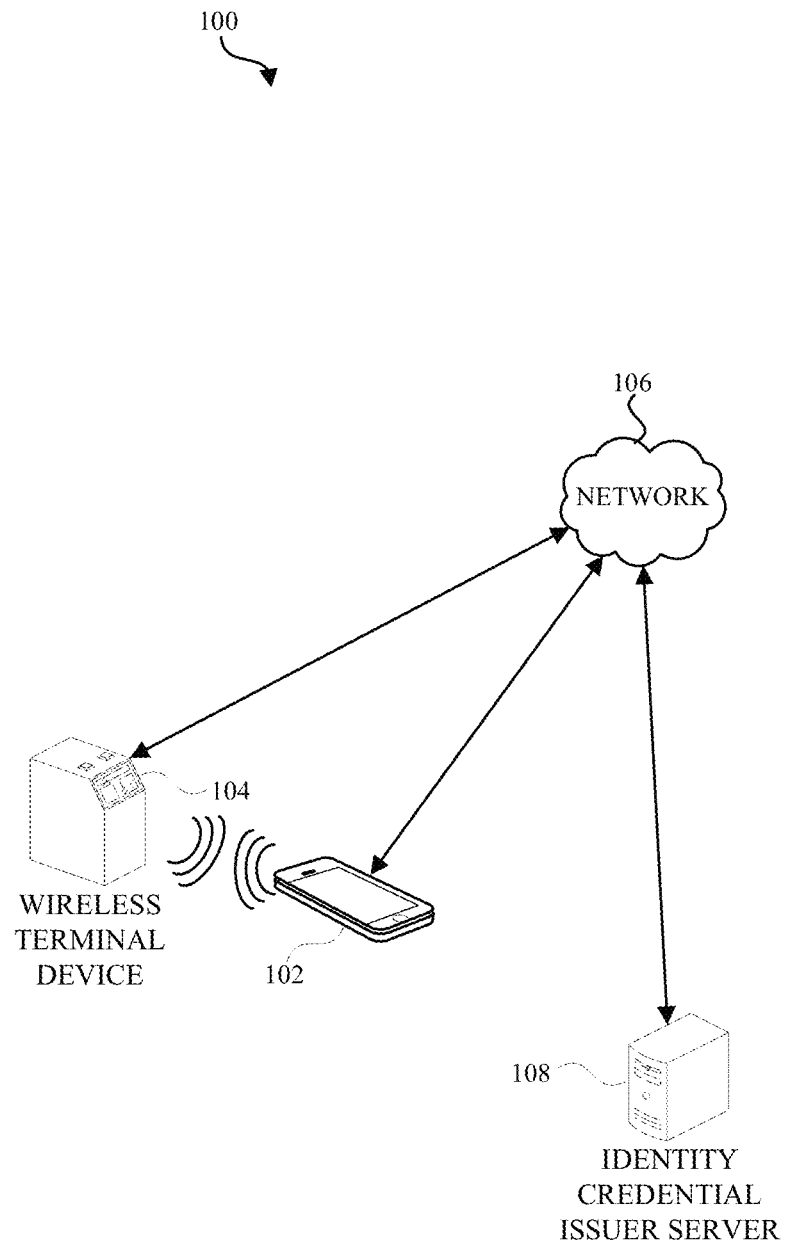
FIG. 1 illustrates an example network environment for controlled identity credential release in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In a digital identity credential system, a user's driver's license, passport, or other identifying credential is digitally stored on the user's electronic device, such as their mobile phone. For example, a governmental authority, or other issuing body, may provision a user's digital identity credential onto the user's device. The subject technology pertains to embodiments where a user may provide all or part of their digital identity credential (and/or the identifying information contained therein), such as their mobile driver's license, to wireless terminal devices of third parties, such as a wireless terminal device of a government official, a store employee, and the like, and/or for display, such as to a governmental authority. The subject system provides controlled methods of releasing, or providing, the user's digital identity credential, such as to government authorities (e.g., transportation security administration (TSA), first responders, security checkpoint personnel, etc.), and/or commercial entities (e.g., to provide identification matching a credit card, proof of age, etc.).

In one example, the user's identity credential is displayed on the user's device while the user's device remains in the locked state. In this manner, the user can provide their device to a third party (e.g., a TSA personnel and/or security checkpoint personnel), without comprising the security/privacy of the user's data stored on the device. For example, the user may select, or initiate display of, the identity credential while the device in an unlocked state, and the selection may automatically cause the device to enter a locked state while displaying the identity credential. Alternatively or in addition to displaying the identity credential, the identity credential may be wireless transmitted to a terminal device of the governmental authority, such as via NFC, Bluetooth, Wi-Fi Aware etc.

In another example, the device of a first responder, such as police officer, firefighter, etc. may have its own digital credential that authorizes the first responder to automatically receive the user's identity credential when in proximity to the user's device. In this instance, the device of the first responder may transmit its own identity credential to the user's device, and the user's device, upon verifying that the first responder is authorized to receive the identity credential, may automatically transmit the user's identity credential to the device of the first responder, e.g., if the user preconfigured their device to provide the user's identity credential and/or other information to a first responder. In one example, the first responder's device can send out a beacon signal that includes the first responder's credential (such as after an earthquake and/or other emergency situation) and any proximate user devices may automatically respond with the corresponding users' identity credentials (and/or location). Thus, in this instance, the user's device may transmit the user's identity credential without the user authenticating, even when the identity credential is secured by a secure element or secure enclave processor of the user's device.

In another example, the identity credential of the user may be provided/displayed in conjunction with another credential, such as a payment credential of the user, or an identity credential of a minor associated with the user (such as a child). In another example, the identity credential may be presented with only a portion of the information on the identity credential visible (such as the user's name and birth date for proof of age), and/or by providing a processed response to a request for information (e.g., 'yes' or 'no') based on information contained in the user's identity credential.

FIG. 1 illustrates an example network environment 100 for controlled identity credential release in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102, a wireless terminal device 104, a network 106, and an identity credential issuer server 108. The network 106 may communicatively (directly or indirectly) couple, for example, any two or more of the electronic device 102, the wireless terminal device 104, and/or the identity credential issuer server 108.

In one or more implementations, the network 106 may be an interconnected network of devices that may include, or may be communicatively coupled to, the Internet. For explanatory purposes, the network environment 100 is illustrated in FIG. 1 as including a single electronic device 102, a single wireless terminal device 104, and a single identity credential issuer server 108; however, the network environment 100 may include any number of electronic devices, wireless terminal devices, and servers.

The electronic device 102 may be, for example, a portable computing device such as a laptop computer, a smartphone, a peripheral device (e.g., a digital camera, headphones), a tablet device, a wearable device such as a watch, a band, and the like, or any other appropriate device that includes one or more wireless interfaces, such as near-field communication (NFC) radios, WLAN radios, Bluetooth radios, Zigbee radios, cellular radios, and/or other wireless radios. In FIG. 1, by way of example, the electronic device 102 is depicted as a mobile device. The electronic device 102 may be, and/or may include all or part of, the electronic device discussed below with respect to FIG. 2, and/or the electronic system discussed below with respect to FIG. 3.

In one or more implementations, the electronic device 102 may include a secure hardware component onto which applet instances, including digital identity credential applet instances, may be provisioned. In one or more implementations, the secure hardware element may back digital identity credentials that are stored in the memory of the electronic device 102. For example, all or part of a digital identity credential may be stored in an encrypted form on the memory of the electronic device 102 where the key for decrypting the digital identity credential is stored on the secure hardware component. An example electronic device that includes a secure hardware component, such as a secure element and/or a secure enclave processor, is discussed further below with respect to FIG. 2.

The wireless terminal device 104 may be, for example, a wireless payment terminal, a tablet device, a mobile device, and/or any device that includes one or more wireless interfaces that may be used to perform a wireless transaction, such as NFC radios, wireless local area network (WLAN) radios, Bluetooth radios, Zigbee radios, cellular radios, and/or other wireless radios. The wireless terminal device 104 may be, and/or may include all or part of, the electronic device discussed below with respect to FIG. 2, and/or the electronic system discussed below with respect to FIG. 3. Although the wireless terminal device 104 is depicted in FIG. 1 as a stationary device, the wireless terminal device 104 may also be a mobile device, such as a mobile phone and/or tablet of a first responder and/or other entity.

The electronic device 102 may communicate with the wireless terminal device 104 via a direct communication (e.g., peer-to-peer communication), such as NFC, Bluetooth, and/or Wi-Fi Aware that bypasses the network 106. In one or more implementations, the electronic device 102 may communicate with the wireless terminal device 104 over the network 106 and/or the wireless terminal device 104 (and/or the electronic device 102) may not be communicatively coupled to the network 106.

The identity credential issuer server 108 may include one or more servers that facilitate providing a digital identity credential for a user, such as a mobile driver's license, an electronic passport, and the like, to the electronic device 102 of the user. In one or more implementations, the identity credential issuer server 108 may be and/or may include a secure mobile platform. For example, the identity credential issuer server 108 may include one or more trusted service manager (TSM) servers that provision/transmit scripts to secure hardware components of electronic devices, such as the electronic device 102, one or more application servers, and/or the like.

In one or more implementations, a digital identity credential may include one or more data fields of user information that has been verified by the identity credential issuer server 108. For example, one or more data fields of a digital identity credential may include a user's name, one or more photos or images of the user (and/or of the user's corresponding physical identity card/document), the user's age (and/or date of birth), donor information, the user's address, the user's driving privileges, an identification number corresponding to the identity credential (e.g., a driver's license number), or generally any user information that is verified and/or managed by the identity credential issuer server 108. In one or more implementations, the digital identity credential may include a public key corresponding to the electronic device 102, and may be signed with a private key corresponding to the identity credential issuer server 108. An example process for provisioning an identity credential on the electronic device 102 is discussed further below with respect to FIG. 3.

The identity credential issuer server 108 may also include one or more servers that facilitate registering wireless terminal devices of third party entities to receive certificates that can be provided by the wireless terminal devices to electronic devices, such as the electronic device 102, with a request for user information to verify that the wireless terminal device is authorized to receive the user information being requested. The third party entities may include governmental entities, commercial entities, first responders, or generally any entities that may need to obtain all or part of a digital identity credential issued by the identity credential issuer server 108.

The certificate provisioned to a wireless terminal device 104 may include information identifying the entity corresponding to the wireless terminal device, may include information identifying the wireless terminal device itself, may include a certificate type or a class/tier of the certificate (and/or of the wireless terminal device), and/or may include a list of data fields of the digital identity credential that the wireless terminal device is authorized to receive.

In one or more implementations, a user of the electronic device 102 may wish to provide and/or display information from an identity credential stored on the electronic device 102. For example, the user may wish to provide the identity credential to a particular entity, e.g. a governmental agency, via the wireless terminal device 104, and/or the user may wish to display information corresponding to their identity credential on the electronic device 102, such as to show to a person associated with the particular entity. For example, the user may select a graphical element displayed on a lock screen of the electronic device 102 to initiate the release of the identity credential, such as in the example lock screen user interface discussed further below with respect to FIG. 11. Example processes of a controlled release of one or more data fields of a user's identity credential are discussed further below with respect to FIGS. 4-6.

In one or more implementations, a user may associate their identity credential to their medical identification information, such that the identity credential may be provided to any device authorized to receive the medical identification information, and/or the user may configure their identity credential to be released to authorized first responders in emergency situations. An example process of a controlled release of an identity credential as part of a release of medical identification information is discussed further below with respect to FIG. 7, and an example process of a wireless terminal device 104 identifying proximate electronic devices in an emergency situation based on information controllably released from an identity credential is discussed further below with respect to FIG. 8.

In one or more implementations, an application executing on the electronic device 102 of a user may request to access the user's identity credential. The request may be displayed to the user and the user may approve of the request, such as via authenticating, in order to have their identity credential controllably (and securely) released to the application, such as to a web browser application to provide for an online transaction. An example process of a controlled release of an identity credential to an application is discussed further below with respect to FIG. 9.

In one or more implementations, the electronic device 102 may be configured to receive identity requests/queries for information from third parties, such as the wireless terminal device 104 and/or an application executing on the electronic device 102. One or more of the identity requests may be requests that can be responded to with a particular response, such as 'true' or 'false', 'yes' or 'no,' and the like, without releasing more specific identifying information about the user. For example, the wireless terminal device 104 may transmit an identity request to confirm that the user is a certain age, such as 21. The electronic device 102 may receive the request, may confirm the age of the user based on the date of birth of the user contained in the user's identity credential and the current date (e.g., obtained from a server), and may respond to the identity request with a processed response, such as 'yes' or 'no.' An example process of a controlled release of a processed response determined from an identity credential is discussed further below with respect to FIG. 10.

In one or more implementations, an identity credential release and/or a release of an identity credential, as described herein may refer to the display and/or transmission of one or more data fields of an identity credential provisioned on the electronic device 102 and/or the display and/or transmission of information derived from one or more data fields of an identity credential provisioned on the electronic device 102.

Figure 2:
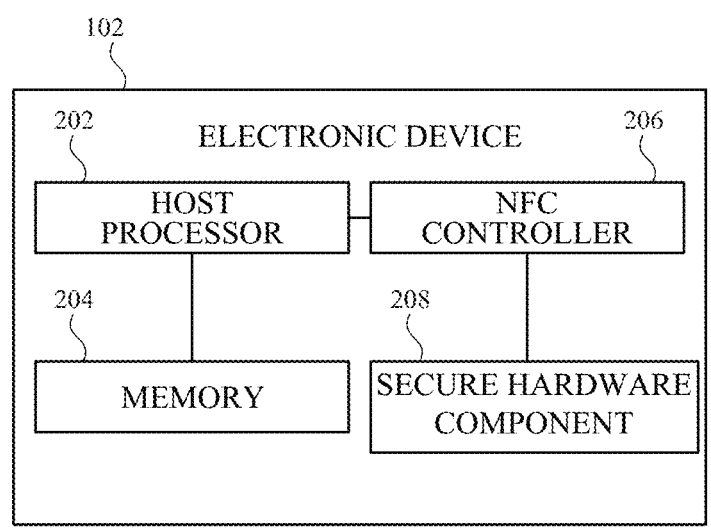
FIG. 2 illustrates an example electronic device in a controlled identity credential release system in accordance with one or more implementations.

FIG. 2 illustrates an example electronic device 102 in a controlled identity credential release system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202, a memory 204, an NFC controller 206, and a secure hardware component 208, which may be, for example, a secure element and/or a secure enclave processor. The secure hardware component 208 may include one or more interfaces for communicatively coupling to the NFC controller 206 and/or the host processor 202, such as via one or more single wire protocol (SWP) connections and/or any other data connection.

The secure hardware component 208 may include one or more provisioned applet instances, e.g., corresponding to one or more digital identity credentials, one or more credit/debit card accounts, and/or one or more other applet instances. In one or more implementations, the operating system and/or execution environment of the secure hardware component 208 may be a JAVA-based operating system and/or JAVA-based execution environment, and the one or more applet instances may be JAVA-based applets. In other implementations, other operating systems, languages, and/or environments can be implemented. In addition to the one or more applet instances, the secure hardware component 208 may also include one or more additional applets for performing other operations, such as a security applet, a registry applet, and the like.

The NFC controller 206 may include one or more antennas and one or more transceivers for transmitting/receiving NFC communications. The NFC controller 206 may further include one or more interfaces, such as a single wire protocol interface, for coupling to the host processor 202 and/or the secure hardware component 208. The NFC controller 206 may be able to communicate via one or more different NFC communication protocols, such as NFC-A (or Type A), NFC-B (or Type B), and/or NFC-F (or Type F or FeliCA). The NFC-A protocol may be based on International Organization for Standardization (ISO)/International Electrotechnical Commission (IEC) 14443A and may use Miller bit coding with a 100 percent amplitude modulation. The NFC-B protocol may be based on ISO/IEC 14443B and may use variations of Manchester encoding along with a 10 percent modulation. The NFC-F protocol may be based on FeliCA JIS X6319-4 and may use a slightly different variation of Manchester coding than the NFC-B protocol.

The wireless terminal device 104 of FIG. 1 may include similar wireless communication capabilities as the electronic device 102. For example, the wireless terminal device 104 may include one or more antennas and/or transceivers for communicating with the electronic device 102 via one or more of an NFC-A protocol, an NFC-B protocol, an NFC-F protocol, a Bluetooth protocol, a Bluetooth low energy protocol, a Zigbee protocol, a Wi-Fi protocol, or generally any communication protocol. In one or more implementations, the wireless terminal device 104 may include a wireless reader, such as an NFC reader.

For explanatory purposes, the electronic device 102 is described as using the NFC controller 206 to initiate communication with the wireless terminal device 104. However, the electronic device 102 may use any wireless communication protocol to communicate with the wireless terminal device 104, such as Bluetooth, Bluetooth low energy, Wi-Fi, Zigbee, millimeter wave (mmWave), or generally any wireless communication protocol. In one or more implementations, a communication session between the electronic device 102 and the wireless terminal device 104 may be initiated over a first wireless communication, such as NFC, and then may be handed off to a second wireless communication, such as Bluetooth, Wi-Fi Aware, or the like.

The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. Additionally, the host processor 202 may enable implementation of an operating system or otherwise execute code to manage operations of the electronic device 102. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, one or more of the host processor 202, the memory 204, the NFC controller 206, the secure hardware component 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
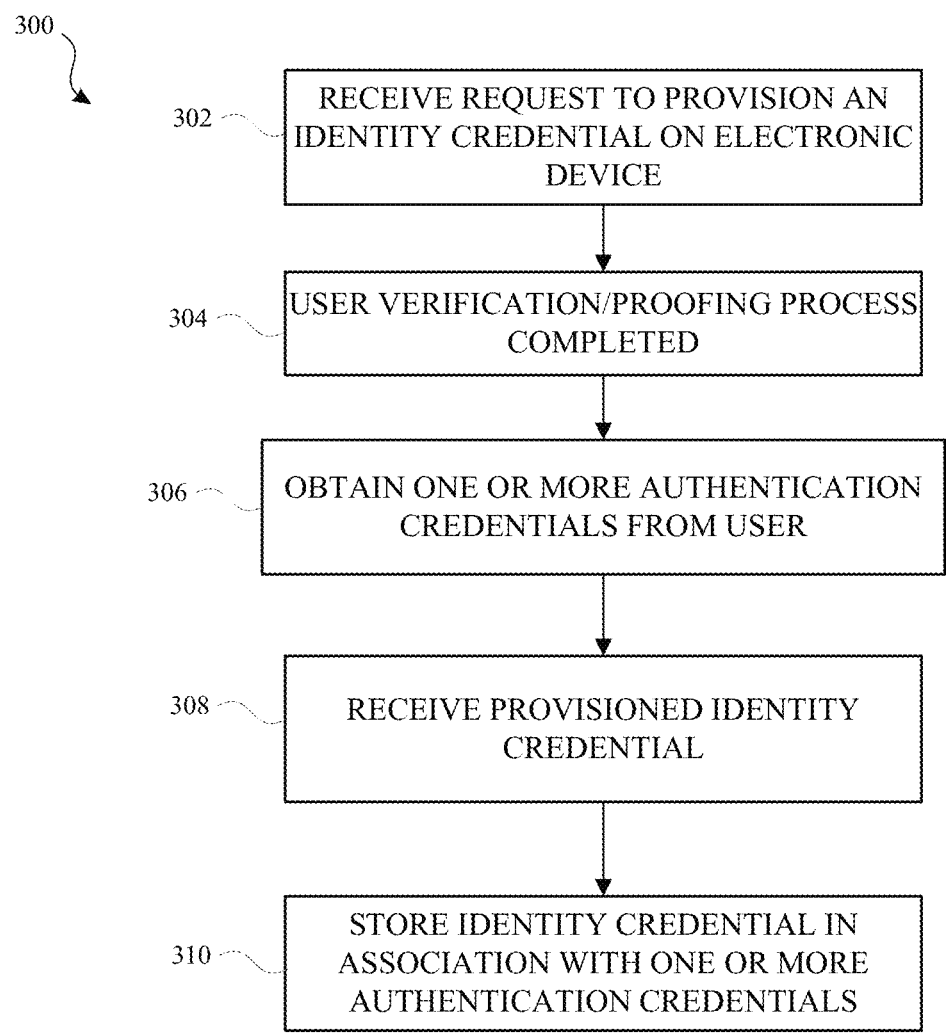
FIG. 3 illustrates a flow diagram of an example process of provisioning an identity credential on an electronic device in accordance with one or more implementations.

FIG. 3 illustrates a flow diagram of an example process 300 of provisioning an identity credential on an electronic device 102 in accordance with one or more implementations. For explanatory purposes, the process 300 is primarily described herein with reference to the electronic device 102 of FIGS. 1-2. However, the electronic device 102 is presented as an exemplary device and the operations described herein may be performed by any suitable device. Further for explanatory purposes, the operations of the process 300 are described herein as occurring in serial, or linearly. However, multiple operations of the process 300 may occur in parallel. In addition, the operations of the process 300 need not be performed in the order shown and/or one or more of the operations of the process 300 need not be performed and/or can be replaced by other operations.

The process 300 may be initiated when the user of the electronic device 102 requests to provision an identity credential on the electronic device 102 (302). The request may be transmitted to the appropriate issuing authority, such as the identity credential issuer server 108, and the issuing authority may require that an identity verification/proofing process be performed (304). For example, the issuing authority may require an image (e.g., optical scan) of the front and back of the user's corresponding physical identification card/document (if one exists), a live image capture and/or video capture of the user, a carrier check and/or phone number check of the user, and/or a one-time password (e.g., the user's phone receives a password, such as via text message, that the user then provides to the issuing authority). In one or more implementations, the user may appear in-person at a location of the issuing authority in order to present documents and/or other details to provision the identity credential on the electronic device 102.

For example, the issuing authority may use the live image of the user to compare with a photo that the issuing agency has on file and/or to compare with the image of the user's identification card/document. In one or more implementations, the user may provide a shared secret known between the issuing authority and the user but not present on the identification card/document, and/or the user may provide a second identification document, such as a birth certificate, social security card, and/or the like.

Once the proofing process is completed (304), the electronic device 102 may obtain one or more authentication credentials from the user, such as a biometric identifier and/or a passcode/password (306). The biometric identifier may be, for example, a fingerprint, a face scan, a retina scan, or the like. In one or more implementations, the electronic device 102 may perform a verification to verify that the biometric identifier is received from the same person that requested that the identity credential be provisioned on the electronic device 102. For example, in the instance of a face scan, the electronic device 102 may initially capture the face scan in conjunction with capturing the live image of the user, as described above.

The electronic device 102 may then receive the provisioned identity credential, such as from the identity credential issuer server 108 (308). The electronic device 102 may store the provisioned identity credential on the electronic device 102 in association with the one or more authentication credentials of the user (310). For example, the identity credential may be stored on a secure hardware component of the electronic device 102, and/or the identity credential may be stored in a memory of the electronic device 102 encrypted with a key that is stored on the secure hardware component.

In one or more implementations, the one or more authentication credentials (which may be referred to as an authentication profile) may be separate from one or more authentication credentials used by the user to lock/unlock the electronic device 102. Thus, in one or more implementations, the electronic device 102 may only release the identity credential of the user when the user authenticates with the electronic device 102 using the one or more authentication credentials stored in association with the identity credential. In one or more implementations, if the one or more authentication credentials includes a passcode (e.g., by itself or in addition to a biometric identifier), the passcode may be used by itself to release the identity credential (e.g., even if a biometric identifier fails).

In one or more implementations, the electronic device 102 may allow the user to preconfigure one or more data fields of the identity credential that are released by default. The electronic device 102 may also allow the user to select and/or change the data fields of the identity credential that are released at the time of release. In one or more implementations, the user may preconfigure different data fields for different uses of the identity credential, such as one or more data fields for security checkpoint (e.g., TSA) checks, one or more data fields for age proofing, one or more data fields for address verification, etc.

In one or more implementations, the electronic device 102 may also allow the user to preconfigure whether the electronic device 102 will remain in, and/or enter, a locked state after releasing the identity credential, or remain in an unlocked state if the electronic device 102 is in an unlocked state when the identity credential is released. The electronic device 102 may allow the user to select different settings for different uses of the identity credential. For example, the user may select to lock the electronic device 102 when the identity credential is provided to a wireless terminal device 104, while the user may select to leave the electronic device 102 in an unlocked state when the identity credential is released to an application, such as a web browser for an online transaction.

In one or more implementations, the electronic device 102 may also allow the user to preconfigure whether the selected data fields from the identity credential are displayed by default when the identity credential is released. The electronic device 102 may also allow the user to select to display one or more data fields of the identity credential at the time of release.

Figure 4:
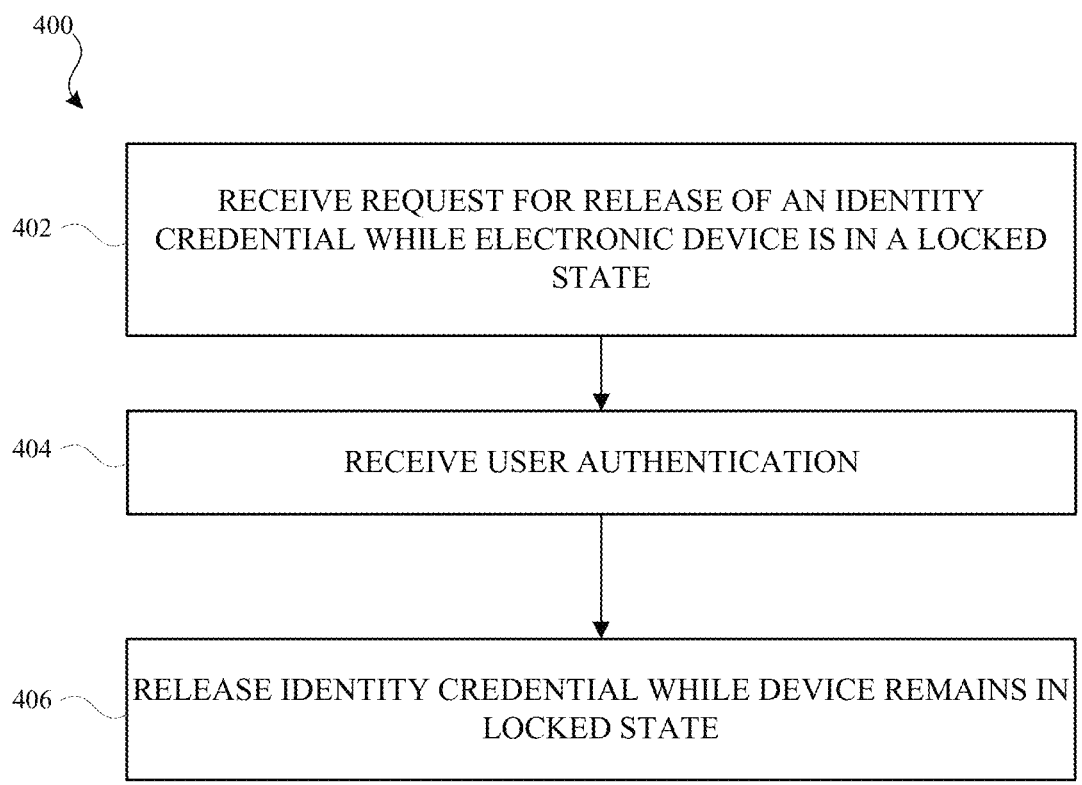
FIG. 4 illustrates a flow diagram of an example process of a controlled release of an identity credential in accordance with one or more implementations.

FIG. 4 illustrates a flow diagram of an example process 400 of a controlled release of an identity credential in accordance with one or more implementations. For explanatory purposes, the process 400 is primarily described herein with reference to the electronic device 102 of FIGS. 1-2. However, the electronic device 102 is presented as an exemplary device and the operations described herein may be performed by any suitable device. Further for explanatory purposes, the operations of the process 400 are described herein as occurring in serial, or linearly. However, multiple operations of the process 400 may occur in parallel. In addition, the operations of the process 400 need not be performed in the order shown and/or one or more of the operations of the process 400 need not be performed and/or can be replaced by other operations.

The process 400 may be initiated when the electronic device 102 receives a request for release of an identity credential while the electronic device 102 is in a locked state (402). For example, the user may initiate the request by selecting an identity credential release graphical element from a lock screen user interface of the electronic device 102 while the electronic device 102 is in the locked state, such as, for example, using the example lock screen user interface discussed further below with respect to FIG. 11. A locked state may refer to a security state of the electronic device 102 where one or more functions of the electronic device 102 are not accessible, whereas the full functionality of the electronic device 102 may be accessible in the unlocked state. For example, a user may not be able to access data/files on the electronic device 102 while the electronic device 102 is in a locked state. However, in one or more implementations, one or more functions of the electronic device 102 may be accessible while in the locked state, such as a camera, flashlight, and an identity credential release function.

The electronic device 102 may then receive a user authentication, where the user authenticates using the one or more authentication credentials that are stored in association with the identity credential, regardless of whether the electronic device 102 is in the locked or unlocked state (404). For example, the user may provide a fingerprint, face scan, passcode, or the like. In the example where the authentication credential stored in association with the identity credential is the same as the authentication credential used to unlock the electronic device 102, the electronic device 102 may still remain in the locked state upon receiving the authentication credential.

Upon receipt of the proper one or more authentication credentials from the user, the electronic device 102 may release the identity credential, such as by providing the one or more data fields preconfigured for release by the user, while the electronic device 102 remains in the locked state (406). In one or more implementations, the one or more data fields of the identity credential may be transmitted to a wireless terminal device 104, such as via NFC, Wi-Fi Aware, Bluetooth, and the like. The NFC transaction may be performed based on a proximity of the electronic device 102 to the wireless terminal device 104, while the Bluetooth and/or Wi-Fi Aware transaction may cause a prompt and confirmation with respect to the electronic device 102 and the wireless terminal device 104. The electronic device 102 may also display the one or more data fields preconfigured for release by the user, if the user preconfigured the display of the data fields on the electronic device 102.

After the release of the identity credential, the electronic device 102 may remain in the locked state, unless the user had previously unlocked the electronic device 102 (e.g., prior to requesting the release of the identity credential) and had preconfigured the electronic device 102 to remain in the unlocked state when releasing the identity credential.

Figure 5:
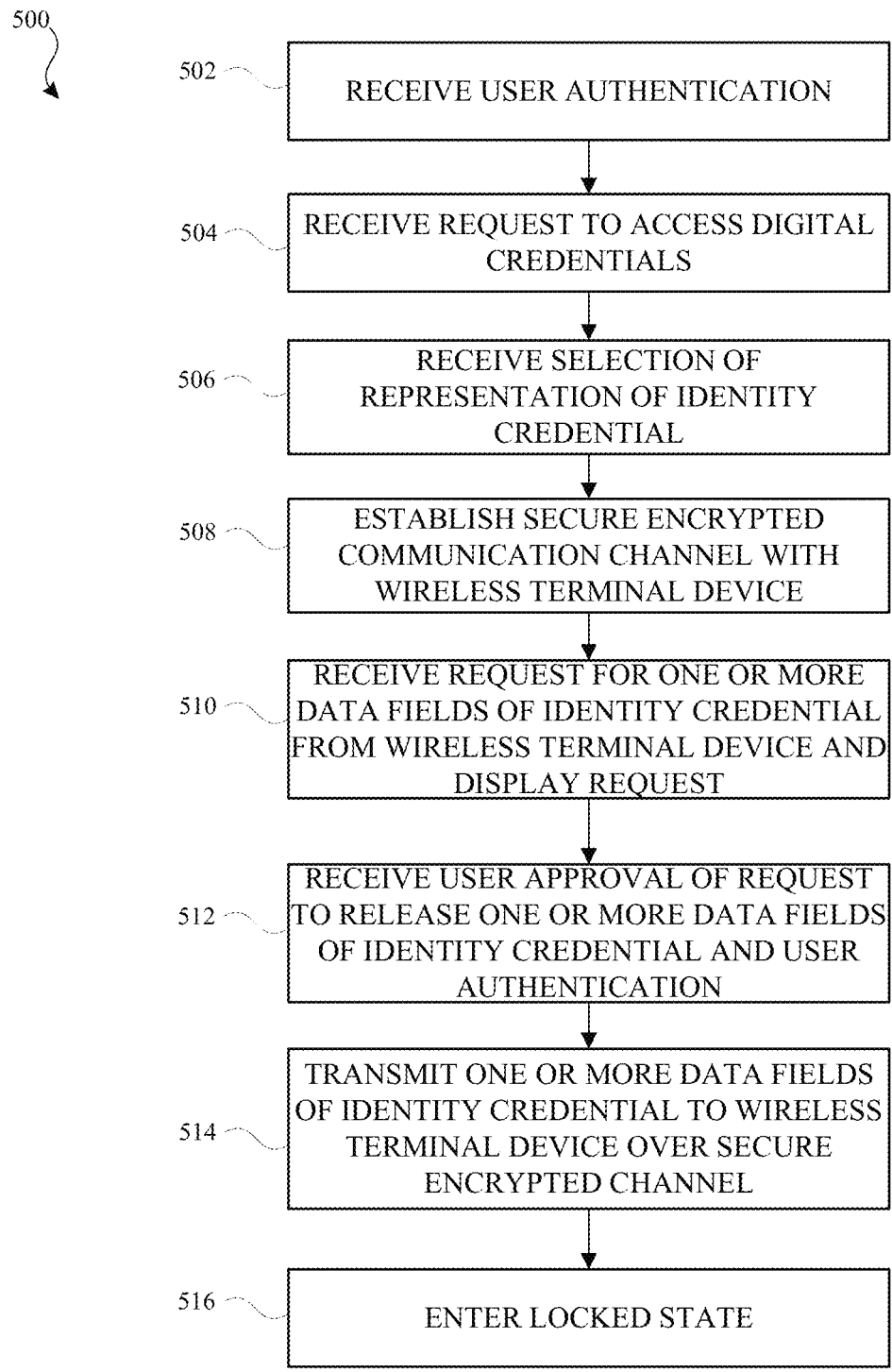
FIG. 5 illustrates a flow diagram of another example process of a controlled release of an identity credential in accordance with one or more implementations.

FIG. 5 illustrates a flow diagram of another example process 500 of a controlled release of an identity credential in accordance with one or more implementations. For explanatory purposes, the process 500 is primarily described herein with reference to the electronic device 102 of FIGS. 1-2. However, the electronic device 102 is presented as an exemplary device and the operations described herein may be performed by any suitable device. Further for explanatory purposes, the operations of the process 500 are described herein as occurring in serial, or linearly. However, multiple operations of the process 500 may occur in parallel. In addition, the operations of the process 500 need not be performed in the order shown and/or one or more of the operations of the process 500 need not be performed and/or can be replaced by other operations.

The process 500 may be initiated when the electronic device 102 receives a user authentication while in a locked state (502). In one or more implementations, the user authentication (502) may not occur if the electronic device 102 is already in the unlocked state. The electronic device 102 may then receive a request from the user to access digital credentials stored on the electronic device 102 (504), such as a request to access a wallet application on the electronic device 102. For example, the user may press one or more combinations of hardware buttons, such as by double clicking a hardware button, and/or the user may select a graphical element corresponding to the wallet application.

In response to the request to access the digital credentials, the electronic device 102 may display representations of one or more digital credentials that are provisioned on the electronic device 102. The digital credentials may include, for example, loyalty credentials, payment credentials, identity credentials, and the like. The electronic device 102 may receive a selection of the representation of the identity credential from the displayed representations of digital credentials (506). In one or more implementations, the user may configure their identity credential as the default credential, in which case the selection may be bypassed.

The electronic device 102 may then prompt the user to hold the electronic device 102 in proximity to a wireless terminal device 104. When the user holds the electronic device 102 near the wireless terminal device 104, the electronic device 102 may establish a secure encrypted channel with the wireless terminal device 104 (508). For example, the devices 102, 104 may utilize NFC to perform the identity credential release transaction and/or may utilize NFC to establish a Bluetooth and/or Wi-Fi Aware communication channel and handoff the identity credential release transaction to the Bluetooth and/or Wi-Fi Aware communication channel (in which case the user does not need to continue to hold the electronic device 102 proximate to the wireless terminal device 104).

In one or more implementations, the wireless terminal device 104 may be configured for a particular purpose, such as for a security checkpoint (e.g., TSA) identity verification check at an airport. Thus, the wireless terminal device 104 may be aware of transactions it is authorized to perform and is aware of the one or more data fields needed from the identity credential in order to verify the user's identity. In one or more implementations, the wireless terminal device 104 may provide a credential to the electronic device 102 that the electronic device 102 can use to verify that the wireless terminal device 104 is authorized to receive the one or more data fields being requested.

Thus, the electronic device 102 may receive, from the wireless terminal device 104, a request for one or more data fields from the identity credential of the user, and the electronic device 102 may display the request to the user (510). If the electronic device 102 receives a verifiable credential from the wireless terminal device 104, the electronic device 102 may also display the name of the verified entity associated with the wireless terminal device 104, such as, for example, "TSA." The electronic device 102 may receive user approval of the request to release the one or more data fields of the identity credential, such as in the form of the one or more authentication credentials stored in association with the identity credential (512). As discussed above, the electronic device 102 may require that the user provide the one or more authentication credentials associated with the identity credential regardless of whether the electronic device 102 is in the locked or unlocked state.

Upon receipt of the user approval and/or user authentication (512), the electronic device 102 transmits the one or more data fields of the identity credential to the wireless terminal device 104 over the secure encrypted communication channel (514). The electronic device 102 may also display the one or more data fields of the identity credential if the user preconfigured the display of the one or more data fields. The electronic device 102 may then enter the locked state, by default, unless the user preconfigured the electronic device 102 to remain in the unlocked state for the given identity credential transaction (516).

Figure 6:
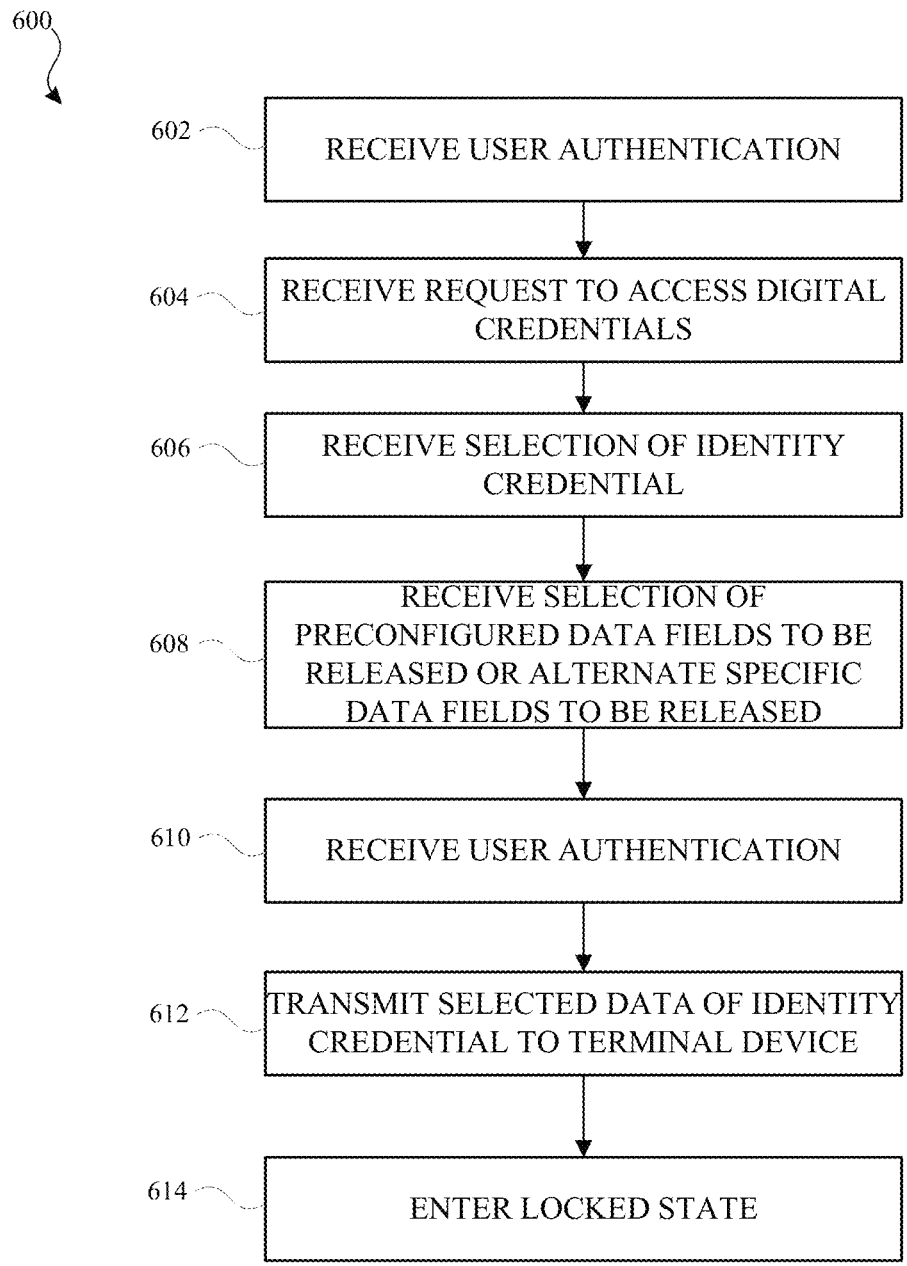
FIG. 6 illustrates a flow diagram of an example process of a controlled release of a subset of data from an identity credential in accordance with one or more implementations.

FIG. 6 illustrates a flow diagram of an example process 600 of a controlled release of a subset of data from an identity credential in accordance with one or more implementations. For explanatory purposes, the process 600 is primarily described herein with reference to the electronic device 102 of FIGS. 1-2. However, the electronic device 102 is presented as an exemplary device and the operations described herein may be performed by any suitable device. Further for explanatory purposes, the operations of the process 600 are described herein as occurring in serial, or linearly. However, multiple operations of the process 600 may occur in parallel. In addition, the operations of the process 600 need not be performed in the order shown and/or one or more of the operations of the process 600 need not be performed and/or can be replaced by other operations.

The process 600 may be initiated when the electronic device 102 receives a user authentication while in a locked state (602). In one or more implementations, the user authentication (602) may not occur if the electronic device 102 is already in the unlocked state. The electronic device 102 may then receive a request from the user to access digital credentials stored on the electronic device 102 (604), such as a request to access a wallet application on the electronic device 102. For example, the user may press one or more combinations of hardware buttons, such as by double clicking a hardware button, and/or the user may select a graphical element corresponding to the wallet application.

In response to the request to access the digital credentials, the electronic device 102 may display representations of one or more digital credentials that are provisioned on the electronic device 102. The digital credentials may include, for example, loyalty credentials, payment credentials, identity credentials, and the like. The electronic device 102 may receive a selection of the representation of the identity credential from the displayed representations of digital credentials (606). In one or more implementations, the user may configure their identity credential as the default credential, in which case the selection may be bypassed.

The electronic device 102 may then provide the user with the option of selecting to release the one or more preconfigured data fields (if any), and/or to select to release alternate specific data fields (608). For example, the user may select to share only the one or more data fields that are necessary for a given transaction, such as to prove their age which may only require the user's photo and date of birth, and/or to prove their address for delivery of goods.

The electronic device 102 may receive, from the user, the one or more authentication credentials stored in association with the identity credential (610). As discussed above, the electronic device 102 may require that the user provide the one or more authentication credentials associated with the identity credential regardless of whether the electronic device 102 is in the locked or unlocked state.

The electronic device 102 may then prompt the user to hold the electronic device 102 in proximity to a wireless terminal device 104. When the user holds the electronic device 102 near the wireless terminal device 104, the electronic device 102 may establish a secure encrypted channel with the wireless terminal device 104, such as NFC, and the electronic device 102 may transmit the selected one or more data fields of the identity credential to the wireless terminal device 104 over the secure encrypted data channel (612). The electronic device 102 may also display the one or more data fields of the identity credential if the user preconfigured the display of the one or more data fields. The electronic device 102 may then enter the locked state, by default, unless the user preconfigured the electronic device 102 to remain in the unlocked state for the given identity credential transaction (614).

Figure 7:
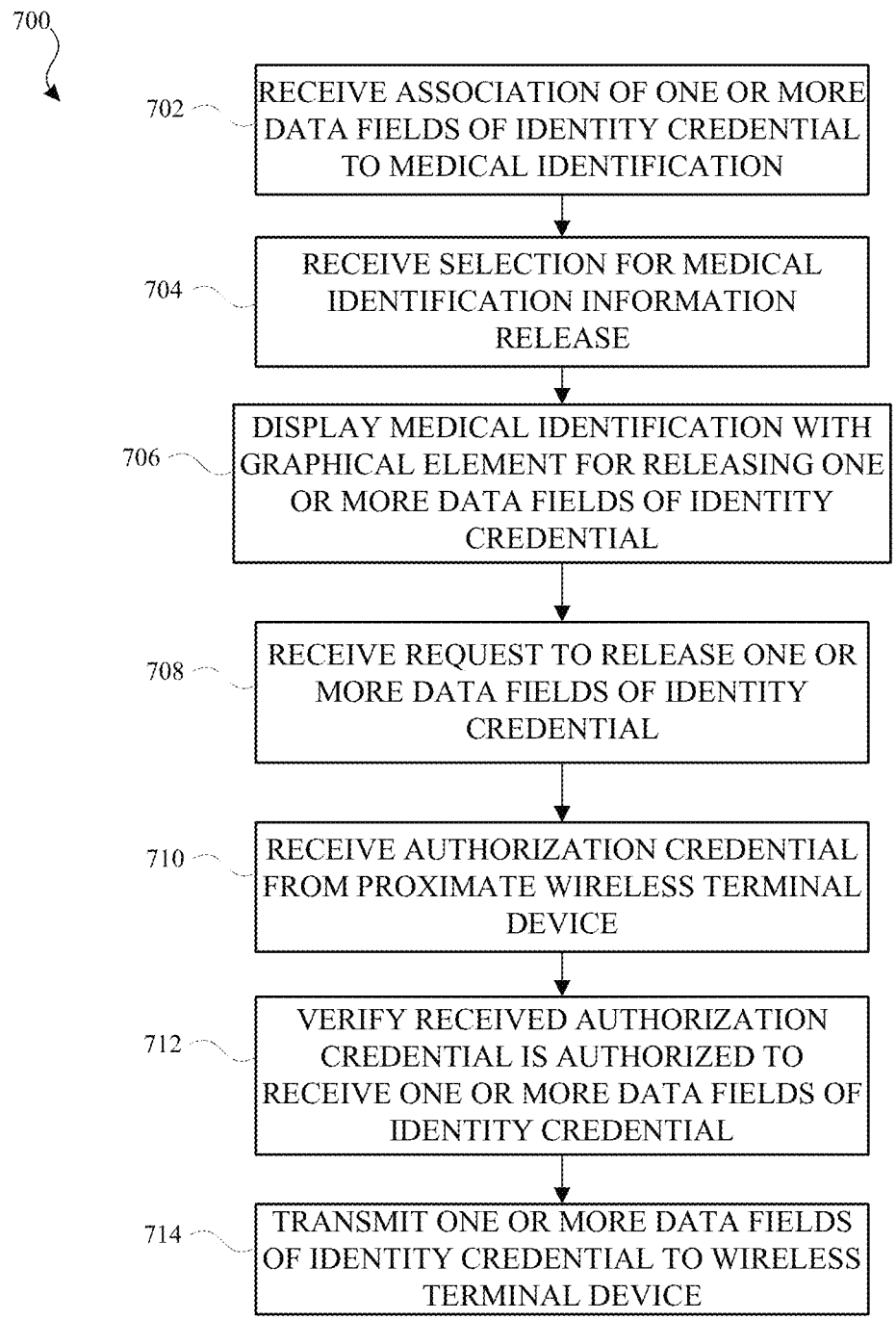
FIG. 7 illustrates a flow diagram of an example process of a controlled release of an identity credential as part of a release of medical identification information in accordance with one or more implementations.

FIG. 7 illustrates a flow diagram of an example process 700 of a controlled release of an identity credential as part of a release of medical identification information in accordance with one or more implementations. For explanatory purposes, the process 700 is primarily described herein with reference to the electronic device 102 of FIGS. 1-2. However, the electronic device 102 is presented as an exemplary device and the operations described herein may be performed by any suitable device. Further for explanatory purposes, the operations of the process 700 are described herein as occurring in serial, or linearly. However, multiple operations of the process 700 may occur in parallel. In addition, the operations of the process 700 need not be performed in the order shown and/or one or more of the operations of the process 700 need not be performed and/or can be replaced by other operations.

The process 700 may be initiated when the electronic device 102 receives a request from the user to associate an identity credential of the user provisioned on the electronic device 102 with a medical identification of the user that is configured/stored on the electronic device 102 (702). For example, the user may have previously configured a medical identification on the electronic device 102, which may provide information regarding the user, such as medical conditions, and that is accessible from the lock screen of the electronic device 102, e.g., while the electronic device 102 is in the locked state.

The user may then consent to the release of one or more selected data fields of their identity credential (e.g., donor status, identification number (e.g., driver's license number), birth date, address, etc.), to an individual accessing the user's medical identification information from the lock screen. However, in one or more implementations, as opposed to the medical identification information, which may be visible to anyone in possession of the electronic device 102, the one or more data fields of the user's identity credential may only be visible when accessed by a person with a wireless terminal device 104 that is authorized to receive the one or more data fields. Alternatively, and/or in addition, the electronic device 102 may allow the user to configure whether the one or more selected data fields are displayed in conjunction with the medical identification information, e.g., with and/or without receiving an authorization credential (as discussed further below).

For example, first responders, police officers, and/or other governmental entities/persons, may have a wireless terminal device 104 that is authorized to access the one or more data fields of the user's identity credential. The wireless terminal device 104 may include its own credential that verifies that the person in possession of the wireless terminal device 104 is authorized to view/receive the one or more data fields of the user's identity credential. The credential of the wireless terminal device 104 may be associated with one or more authentication credentials (e.g., biometric, passcode, etc.) of the person in possession of the wireless terminal device 104, and therefore the credential may act as a digital badge or security credential of the person, such as a first responder. Alternatively, and/or in addition, a special key authorization may be provisioned on the wireless terminal device 104 that allows the wireless terminal device 104 to act as an authorized terminal to receive the one or more data fields of the user's identity credential.

In one or more implementations, the credential stored on the wireless terminal device 104 may have a signature (e.g., via a public key of the authority who issued the credential), as well as a public key from the wireless terminal device 104 when provisioned (e.g., to ensure the credential is not forged). The signature of the authority and/or the public key of the wireless terminal device 104 may be stored with either the credential of the wireless terminal device 104 and/or a terminal application used by the wireless terminal device 104 to perform the transaction to ensure that the wireless terminal device 104 is authorized to receive the one or more data fields of the user's identity credential. For example, the signature and/or public key may be referred to as an authorization credential of the wireless terminal device 104.

In one or more implementations, the credential may be stored on the wireless terminal device 104 in association with a particular first responder and therefore may verify that the particular first responder is authorized to receive the one or more data fields of the user's identity credential. In one or more implementations, the signature may be associated with the application on the wireless terminal device 104, such that a user may authenticate with the wireless terminal device 104 to use the wireless terminal device 104, but may not have an individual credential on the wireless terminal device 104. Instead, the wireless terminal device 104 has a provisioned public key that proves that the wireless terminal device 104 is authorized to access the one or more data fields from the user's identity credential and that the wireless terminal device 104 is in good standing as a reader application.

Thus, the electronic device 102 of the user may receive a selection to release the medical identification information, such as when a first responder selects a medical release graphical element from the lock screen (704). The electronic device 102 may responsively display the medical identification information along with a graphical element for releasing the one or more data fields from the user's identity credential (706). The electronic device 102 may then receive a request to release the one or more data fields of the identity credential, such as when the first responder selects the displayed graphical element corresponding to the release of the one or more data fields of the identity credential (708).

Assuming that wireless terminal device 104 and the electronic device 102 are within a given proximity, the electronic device 102 may then receive an authorization credential from the wireless terminal device 104 (710), such as over an NFC connection, a Bluetooth connection, and/or a Wi-Fi Aware connection. The electronic device 102 then verifies that the received authorization credential is authorized to receive the one or more data fields of the user's identity credential (712).

For example, if the authorization credential includes a public key (e.g., digital signature), the electronic device 102 may confirm that the public key is authorized, such as by confirming with the organization that would issue the credential to the wireless terminal device 104. Furthermore, the public key (e.g., signature) of the wireless terminal device 104 would confirm that the credential was not forged. Alternatively, and/or in addition, if the authorization credential includes a public key of the terminal application, the electronic device 102 may check the public key to confirm that the terminal application is authorized to receive the one or more data fields and to confirm that the terminal application public key was not forged.

When the received authorization credential is verified (712), the electronic device 102 transmits the one or more data fields of the user's identity credential to the wireless terminal device 104 of the first responder (714), such as via NFC, Bluetooth, Wi-Fi Aware, or the like. In one or more implementations, if the user of the electronic device 102 preconfigured the electronic device 102 to display the one or more data fields of the identity credential when authorization is received from the wireless terminal device 104, the one or more data fields may be displayed in conjunction with, and/or in lieu of, transmitting the one or more data fields of the identity credential to the wireless terminal device 104. Since the first responder may not be an authorized user of the electronic device 102 itself, the electronic device 102 remains in a locked state for the duration of the process 700 and remains in the locked state until the user of the electronic device 102 unlocks the electronic device 102.

In one or more implementations, the electronic device 102 of the user may store a history of identity requests, such as from first responders, which may also include and/or indicate the identity of the first responder. The stored history may further include a time and location corresponding to the request, as well as an indication of the information that was provided to the first responder.

Figure 8:
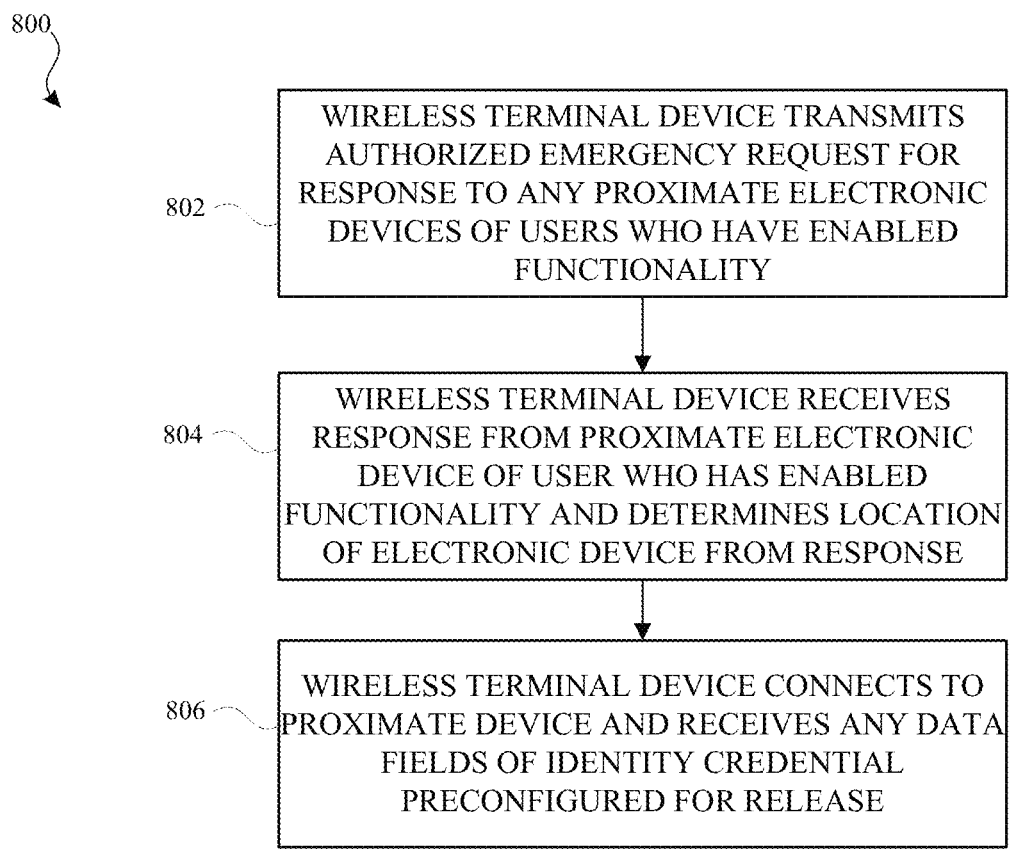
FIG. 8 illustrates a flow diagram of an example process of a terminal device identifying proximate electronic devices in an emergency situation based on information controllably released from an identity credential in accordance with one or more implementations.

FIG. 8 illustrates a flow diagram of an example process 800 of a wireless terminal device 104 identifying proximate electronic devices in an emergency situation based on information controllably released from an identity credential in accordance with one or more implementations. For explanatory purposes, the process 800 is primarily described herein with reference to the wireless terminal device 104 of FIG. 1. However, the wireless terminal device 104 is presented as an exemplary device and the operations described herein may be performed by any suitable device. Further for explanatory purposes, the operations of the process 800 are described herein as occurring in serial, or linearly. However, multiple operations of the process 800 may occur in parallel. In addition, the operations of the process 800 need not be performed in the order shown and/or one or more of the operations of the process 800 need not be performed and/or can be replaced by other operations.

Prior to the initiation of the process 800, the user of the electronic device 102 may have configured their medical identification information to activate a "find me" function. The find me function may allow the location of the electronic device 102 to be determined by an authorized wireless terminal device 104, such as a first responder in an emergency response situation who is searching for electronic devices that are still functioning and have the find me functionality enabled. The electronic device 102 may also allow the user to select one or more data fields of the identity credential that may be released/transmitted in conjunction with the find me functionality. For example, the user of the electronic device 102 has certain medical conditions, it may be beneficial to provide such information to a first responder in emergency situations.

For example, the "find me" functionality may be used in situations where first responders are searching for users in emergency situations, such as disaster relief, where users may not be easily located. However, the a user's electronic devices, e.g., mobile devices, wearable devices, such as a watch, etc., may be in close proximity to the user. Thus, first responders can use the find me functionality to scan for radio signals from the electronic devices of users who have enabled the find me functionality. The wireless terminal device 104 of a first responder may be authorized to read/receive the location of users' electronic devices with the find me functionality enabled in a similar manner as described above with respect to FIG. 7. For example, the wireless terminal device 104 may have a particular application for performing the find me functionality, an entitlement, a signature (e.g. public key of authority), and a public key of the wireless terminal device 104 itself.

Thus, the process 800 may be initiated when a first responder uses their authorized wireless terminal device 104 to transmit an authorized emergency request for response to any proximate electronic devices of users who have enabled the find me functionality (802). In one or more implementations, the authorized emergency request for response may be in the form of a beacon message (e.g., that may include the first responder's credential), to which any electronic device that has the find me functionality enabled will automatically transmit (e.g., without authorization and based on the user's pre-configuration), a response to the beacon.

The wireless terminal device 104 receives the response from the proximate electronic device 102 of a user who has enabled the find me functionality, and the wireless terminal device 104 determines the location of the electronic device 102 based on the response (804). For example, the response may include coordinates corresponding to the location of the electronic device 102, and/or the response may be the initiation of a time of flight signal exchange between the electronic device 102 and the wireless terminal device 104 that may be used to precisely locate the electronic device 102, such as through ultra-wideband ranging. In one or more implementations, the receipt of the authorized emergency request for response may cause the electronic device 102 to output an audio sound, e.g. a ping, that may be used to locate the electronic device 102.

Once the first responder locates the electronic device 102, the first responder may hold their wireless terminal device 104 in close proximity to the electronic device 102 to connect to the electronic device 102, e.g. via NFC, and receive any data fields of the identity credential that the user preconfigured for release with the medical identification information (806), e.g. as described above if FIG. 7. The electronic device 102 may remain in a locked state for the duration of the process 800 since the first responder may not be an authorized user of the electronic device 102.

Figure 9:
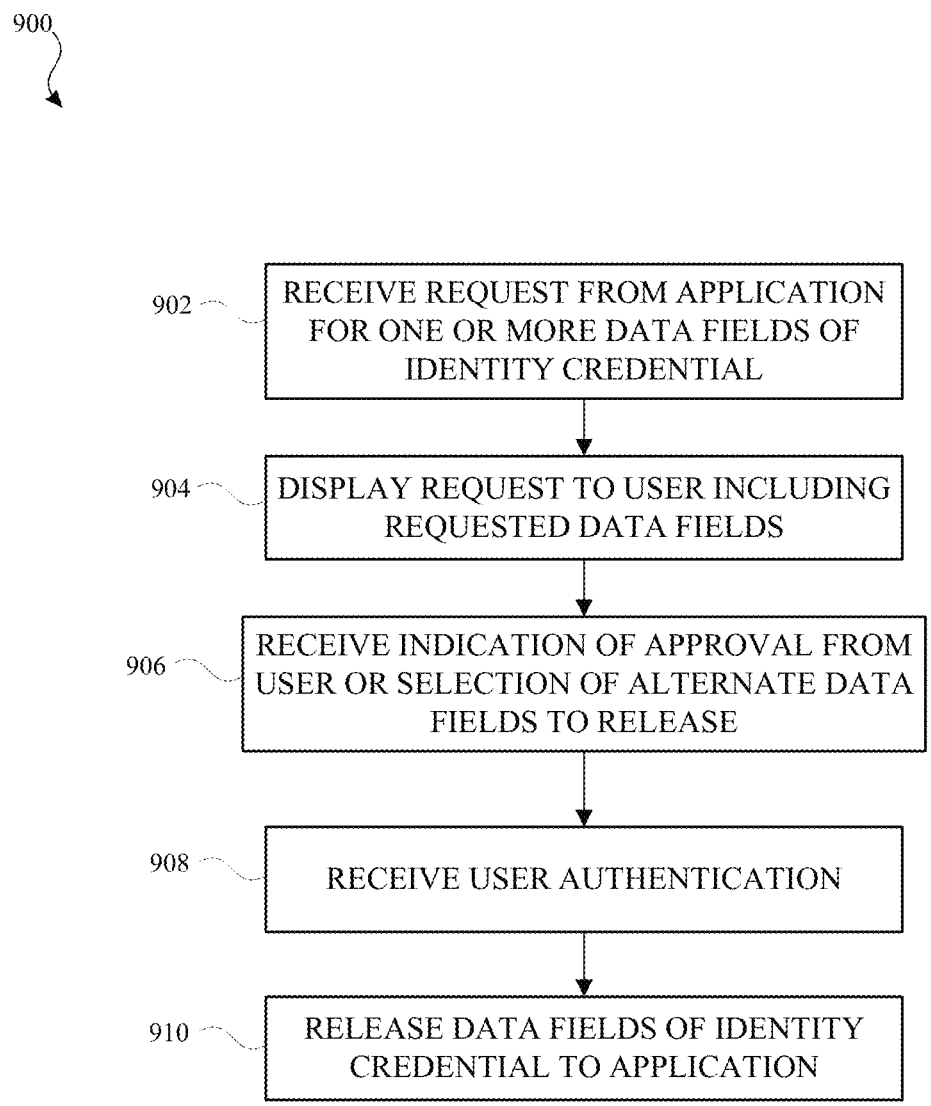
FIG. 9 illustrates a flow diagram of an example process of a controlled release of an identity credential to an application in accordance with one or more implementations.

FIG. 9 illustrates a flow diagram of an example process 900 of a controlled release of an identity credential to an application in accordance with one or more implementations. For explanatory purposes, the process 900 is primarily described herein with reference to the electronic device 102 of FIGS. 1-2. However, the electronic device 102 is presented as an exemplary device and the operations described herein may be performed by any suitable device. Further for explanatory purposes, the operations of the process 900 are described herein as occurring in serial, or linearly. However, multiple operations of the process 900 may occur in parallel. In addition, the operations of the process 900 need not be performed in the order shown and/or one or more of the operations of the process 900 need not be performed and/or can be replaced by other operations.

The process 900 may be initiated when the electronic device 102 receives a request from an application executing on the electronic device 102 for one or more data fields of an identity credential of the user that is provisioned on the electronic device 102 (902). For example, the operating system of the electronic device 102 may include an application programming interface (API) that allows applications, such as third party applications, to request one or more data fields of an identity credential provisioned on the electronic device 102 for verification. The API may be, for example, an entitlement provided to third party developers based on the application. In one or more implementations, the third party developers may agree to particular terms and/or stipulations regarding the use of the received one or more data fields.

Thus, the application making the request for the one or more data fields (902) may have an entitlement to request the one or more data fields of the identity credential. The application may request, for example, confirmation that an identity credential is provisioned on the electronic device 102, one or more specific data fields of the identity credential, and/or the entirety of the identity credential. The electronic device 102 may display the request to the user, including an identification of the one or more requested data fields (if any) (904).

The electronic device 102 may receive approval from the user, and/or may receive a selection of alternate one or more data fields to release to the application (906). For example, the electronic device 102 may display the one or more requested data fields in a user interface that allows the user to deselect one or more of the data fields and/or to select one or more additional/alternative data fields of the identity credential. The electronic device 102 may receive an authentication of the user using the one or more authentication credentials stored in association with the identity credential (908). The electronic device 102 may then release the one or more selected and/or requested data fields to the application, such as via the API (910).

Figure 10:
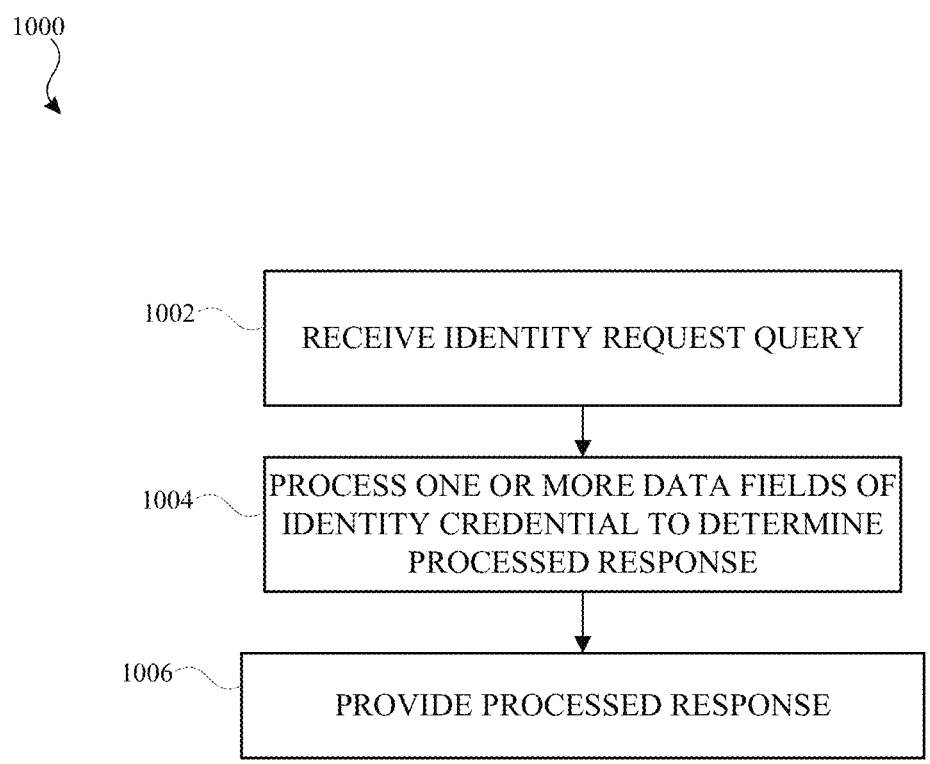
FIG. 10 illustrates a flow diagram of an example process of a controlled release of a processed response determined from an identity credential in accordance with one or more implementations.

FIG. 10 illustrates a flow diagram of an example process 1000 of a controlled release of a processed response determined from an identity credential in accordance with one or more implementations. For explanatory purposes, the process 1000 is primarily described herein with reference to the electronic device 102 of FIGS. 1-2. However, the electronic device 102 is presented as an exemplary device and the operations described herein may be performed by any suitable device. Further for explanatory purposes, the operations of the process 1000 are described herein as occurring in serial, or linearly. However, multiple operations of the process 1000 may occur in parallel. In addition, the operations of the process 1000 need not be performed in the order shown and/or one or more of the operations of the process 1000 need not be performed and/or can be replaced by other operations.

Prior to the initiation of the process 1000, a user of the electronic device 102 may preconfigure one or more sets of data fields for release for particular purposes. For example, the user may preconfigure their photo and birthdate for release for purchasing alcohol and/or visiting bars. When the electronic device 102 receives a request for information, a user interface may be displayed to the user with the different preconfigured sets of data fields for release, and the user may select the appropriate set of data fields.

In one or more implementations, the user may preconfigure the release of one or more processed or calculated responses to requests for information. A processed response may be a response that can be provided to confirm some information regarding the user without actually releasing the information being confirmed. For example, it may not be necessary to provide a user's date of birth to respond to a query/challenge from a wireless terminal device 104 to prove that the user is a certain age, e.g., 21. Instead, the electronic device 102 can retrieve the date of birth of the user from the user's provisioned identity credential, can retrieve the current date, e.g. from a time server, and can process or calculate a response based on the retrieved current date and the date of birth from the user's identity credential. The electronic device 102 can then respond to the query from the wireless terminal device 104 with a 'yes' or 'no' answer without actually divulging the date of birth (and consequently actual age) of the user.

In one or more implementations, this type of query/challenge can be used by the wireless terminal device 104 to query any date field, such as expiration date, date of issuance, etc. The wireless terminal device 104 can pose the query as, is the expiration date equal to or less than the current date, which would indicate whether the credential had expired. Other examples of processed responses may include, for example, responses to whether the user is a citizen of a particular country (without providing the actual address of the user), whether the gender of the user is female (or male), or whether the identity credential of the user has an extra entitlement (e.g., a particular class of driver, such as a C class driver).

Thus, the process 1000 may be initiated when the electronic device 102 receives an identity request query from a wireless terminal device 104, such as over a local area network connection (1002). The query may be formatted as a question, such as is the user's age equal to or greater than a particular age, is the expiration date equal to or less than today's date, and/or is the gender of the user female. The electronic device 102 may process one or more data fields of the user's identity credential, and/or may retrieve information over a network, such as retrieving the current date from a time server, to determine a processed response (1004), such as 'yes' or 'no.' The electronic device 102 may then transmit the processed response to the wireless terminal device 104 (1006).

Figure 11:
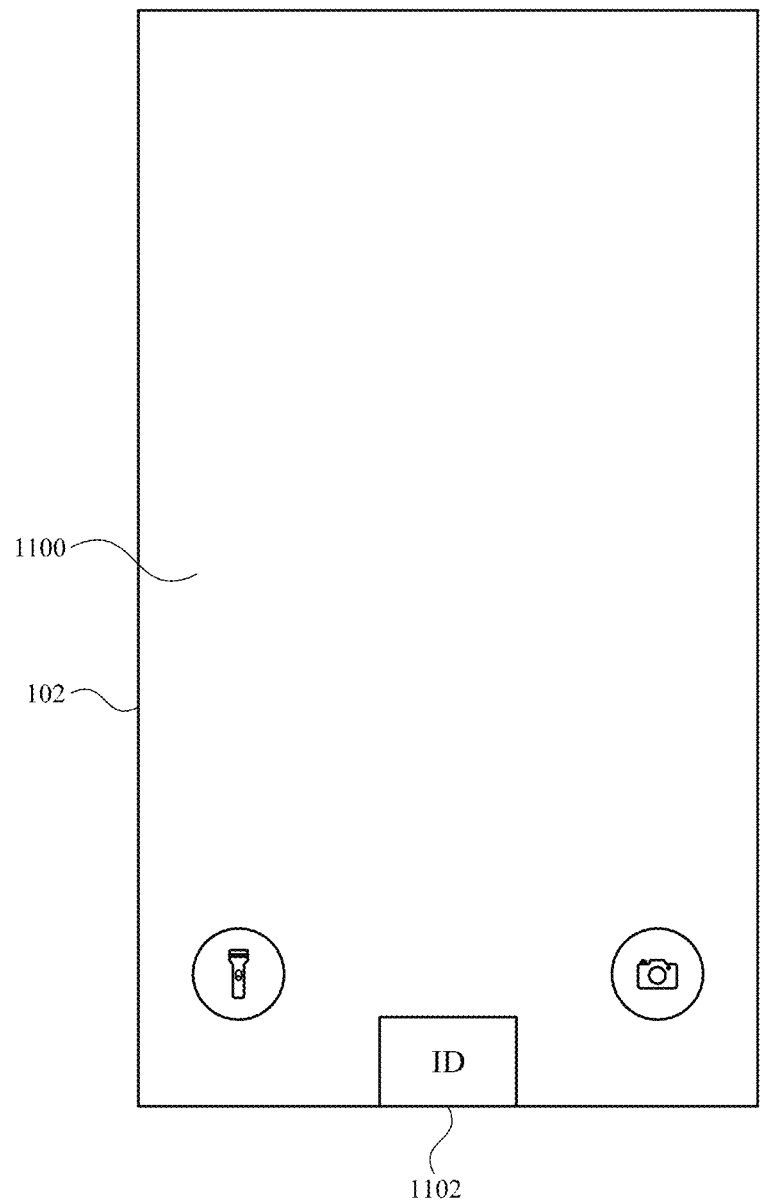
FIG. 11 illustrates an example lock screen user interface that may be implemented by an electronic device in a controlled identity credential release system in accordance with one or more implementations.

FIG. 11 illustrates an example lock screen user interface 1100 that may be implemented by an electronic device 102 in a controlled identity credential release system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The example lock screen user interface 1100 includes a graphical element 1102 for initiating the release of one or more data fields from the lock screen user interface 1100. Thus, when the electronic device 102 receives a selection of the graphical element 1102, such as while in the locked state, the electronic device 102 may initiate the release of one or more data fields of an identity credential provisioned on the electronic device 102, as is discussed further above with respect to FIGS. 4-6.

Figure 12:
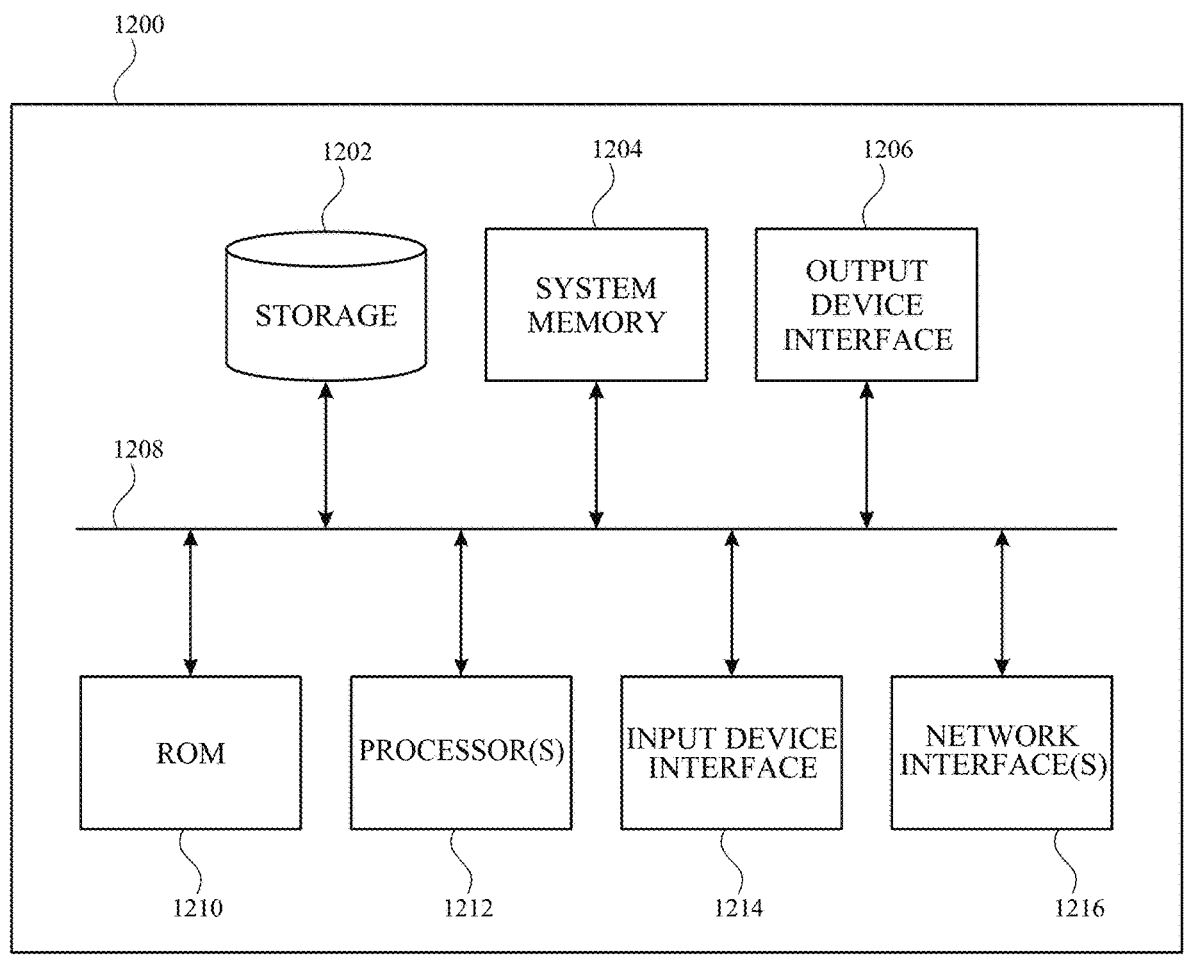
FIG. 12 conceptually illustrates an example electronic system with which aspects of the subject technology may be implemented in accordance with one or more implementations.

FIG. 12 conceptually illustrates an electronic system 1200 with which one or more implementations of the subject technology may be implemented. The electronic system 1200 can be, and/or can be a part of, the electronic device 102, the wireless terminal device 104, and/or the identity credential issuer server 108 shown in FIG. 1. The electronic system 1200 may include various types of computer readable media and interfaces for various other types of computer readable media. The electronic system 1200 includes a bus 1208, one or more processing unit(s) 1212, a system memory 1204 (and/or buffer), a ROM 1210, a permanent storage device 1202, an input device interface 1214, an output device interface 1206, and one or more network interfaces 1216, or subsets and variations thereof.

The bus 1208 collectively represents all system, peripheral, and chipset buses that communicatively connect the numerous internal devices of the electronic system 1200. In one or more implementations, the bus 1208 communicatively connects the one or more processing unit(s) 1212 with the ROM 1210, the system memory 1204, and the permanent storage device 1202. From these various memory units, the one or more processing unit(s) 1212 retrieves instructions to execute and data to process in order to execute the processes of the subject disclosure. The one or more processing unit(s) 1212 can be a single processor or a multi-core processor in different implementations.

The ROM 1210 stores static data and instructions that are needed by the one or more processing unit(s) 1212 and other modules of the electronic system 1200. The permanent storage device 1202, on the other hand, may be a read-and-write memory device. The permanent storage device 1202 may be a non-volatile memory unit that stores instructions and data even when the electronic system 1200 is off. In one or more implementations, a mass-storage device (such as a magnetic or optical disk and its corresponding disk drive) may be used as the permanent storage device 1202.

In one or more implementations, a removable storage device (such as a floppy disk, flash drive, and its corresponding disk drive) may be used as the permanent storage device 1202. Like the permanent storage device 1202, the system memory 1204 may be a read-and-write memory device. However, unlike the permanent storage device 1202, the system memory 1204 may be a volatile read-and-write memory, such as random access memory. The system memory 1204 may store any of the instructions and data that one or more processing unit(s) 1212 may need at runtime. In one or more implementations, the processes of the subject disclosure are stored in the system memory 1204, the permanent storage device 1202, and/or the ROM 1210. From these various memory units, the one or more processing unit(s) 1212 retrieves instructions to execute and data to process in order to execute the processes of one or more implementations.

The bus 1208 also connects to the input and output device interfaces 1214 and 1206. The input device interface 1214 enables a user to communicate information and select commands to the electronic system 1200. Input devices that may be used with the input device interface 1214 may include, for example, alphanumeric keyboards and pointing devices (also called "cursor control devices"). The output device interface 1206 may enable, for example, the display of images generated by electronic system 1200. Output devices that may be used with the output device interface 1206 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 12, the bus 1208 also couples the electronic system 1200 to one or more networks and/or to one or more network nodes, such as the electronic device 102 shown in FIG. 1, through the one or more network interface(s) 1216. In this manner, the electronic system 1200 can be a part of a network of computers (such as a LAN, a wide area network ("WAN"), or an Intranet, or a network of networks, such as the Internet. Any or all components of the electronic system 1200 can be used in conjunction with the subject disclosure.

As described above, one aspect of the present technology is the gathering and use of data available from specific and legitimate sources to improve controlled identity credential release. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to provision and/or release identity credentials in accordance with a user's preferences. Accordingly, use of such personal information data enables users to have greater control of the identity credentials provisioned on their electronic devices. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of controlled identity credential release, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, pre-configurations of releases of identity credentials can be performed based on aggregated non-personal information data or a bare minimum amount of personal information, such as the content being handled only on the user's device or other non-personal information available to the controlled identity credential release services.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving, by an electronic device, a request to release an identity credential of a user, the identity credential being stored on the electronic device; and
   providing the identity credential in conjunction with causing the electronic device to enter a locked state from an unlocked state based at least in part on a user configuration setting corresponding to providing the identity credential.

2. The method of claim 1, wherein receiving the request to release the identity credential comprises:
   displaying, by the electronic device while in an unlocked state, a representation of the identity credential; and
   receiving, by the electronic device while in the unlocked state, a user selection of the representation of the identity credential.

3. The method of claim 2, wherein providing the identity credential further comprises:
   causing the electronic device to enter the locked state; and
   displaying, by the electronic device, information from the identity credential while in the locked state.

4. The method of claim 3, wherein the displayed information comprises only a portion of the identity credential.

5. The method of claim 1, further comprising:
   storing a plurality of biometric identifiers of the user on the electronic device, wherein exclusively one of the plurality of biometric identifiers is associated with the identity credential; and
   providing the identity credential only when the user authenticates using the one of the plurality of biometric identifiers that is associated with the identity credential.

6. The method of claim 1, wherein receiving the request to release the identity credential comprises:
   receiving, from another device via a direct wireless connection, the request to release the identity credential.

7. The method of claim 6, wherein providing the identity credential comprises:
   transmitting, via the direct wireless connection, the identity credential to the other device.

8. The method of claim 7, wherein the direct wireless connection comprises at least one of a Bluetooth connection, an NFC connection, or a Wi-Fi Aware connection.

9. The method of claim 6, wherein the other device is associated with a first responder, and the request comprises a first responder credential that authorizes an automatic wireless transmission of the identity credential from the electronic device to the other device.

10. The method of claim 9, wherein the request comprises a beacon message that is received by the electronic device and any other proximate electronic devices.

11. The method of claim 9, wherein the automatic wireless transmission of the identity credential is performed without authentication of the user of the electronic device and the identity credential is secured on the electronic device by a secure element or a secure enclave processor.

12. The method of claim 1, wherein providing the identity credential further comprises:
   providing another credential in addition to the identity credential, wherein the other credential comprises at least one of a payment credential or an identity credential of a minor.

13. A device comprising:
a memory configured to store data; and
at least one processor configured to:
   receive, while the device is in an unlocked state, a request to release an identity credential of a user, the identity credential being stored in the memory of the device;
   receive an authentication of the user associated with the identity credential; and
   provide the identity credential and responsively cause the device to enter a locked state from the unlocked state, wherein at least some of the data that is accessible to a user in the unlocked state is inaccessible in the locked state.

14. The device of claim 13, wherein the at least one processor is further configured to:
   display, while the device is in the unlocked state, a representation of the identity credential; and
   receive, while in the device is in the unlocked state, a user selection of the representation of the identity credential.

15. The device of claim 14, wherein the at least one processor is further configured to:
   display information from the identity credential while in the locked state.

16. The device of claim 13, wherein the at least one processor is further configured to:
   receive, from an application executing on the at least one processor, the request to release the identity credential.

17. A non-transitory machine readable medium comprising code that, when executed by one or more processors, causes the one or more processors to perform operations, the code comprising:
   code to receive, by an electronic device in a locked state, a request to release an identity credential of a user, the identity credential being stored on the electronic device;
   code to receive an authentication of the user associated with the identity credential without causing the electronic device to enter an unlocked state, the authentication of the user being for unlocking the electronic device; and
   code to provide, responsive to receipt of the authentication of the user for unlocking the electronic device, the identity credential while maintaining the electronic device in the locked state.

18. The non-transitory machine readable medium of claim 17, wherein the code to provide the identity credential further comprises:
   code to display information from the identity credential.

19. The non-transitory machine readable medium of claim 18, wherein the code to receive the request to release the identity credential comprises:
   code to receive, from another device via direct wireless connection, the request to release the identity credential.

20. The non-transitory machine readable medium of claim 19, wherein the code to provide the identity credential further comprises:
   code to provide, to the other device via the direct wireless connection, at least a portion of the information from the identity credential.

* * * * *